United States Patent
Essiambre

(12) 
(10) Patent No.: US 6,583,907 B1
(45) Date of Patent: Jun. 24, 2003

(54) OPTICAL COMMUNICATIONS SYSTEM AND METHOD OF OPERATION FOR PERFORMANCE RECOVERY BY POST-TRANSMISSION DISPERSION COMPENSATION

(75) Inventor: Rene'-Jean Essiambre, Red Bank, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/345,513

(22) Filed: Jul. 1, 1999

(51) Int. Cl.$^7$ .............................................. H04B 10/00
(52) U.S. Cl. ..................... 359/161; 359/153; 359/173
(58) Field of Search .................. 359/109, 124, 359/153, 154, 161, 173, 188, 195; 385/24, 123

(56) References Cited

U.S. PATENT DOCUMENTS

| | | | | |
|---|---|---|---|---|
| 5,218,662 A | * | 6/1993 | Dugan ......................... | 385/123 |
| 5,361,319 A | * | 11/1994 | Antos et al. ................ | 385/123 |
| 5,430,822 A | | 7/1995 | Shigematsu et al. ........ | 385/123 |
| 5,539,563 A | * | 7/1996 | Park ............................ | 359/161 |
| 5,721,800 A | | 2/1998 | Kato et al. .................. | 385/127 |
| 5,886,804 A | * | 3/1999 | Onaka et al. ............... | 359/161 |
| 6,188,823 B1 | * | 2/2001 | Ma ............................. | 385/123 |
| 6,292,603 B1 | * | 9/2001 | Mizuochi et al. ............ | 385/24 |
| 6,304,691 B1 | * | 10/2001 | Espindola et al. ............ | 385/24 |

OTHER PUBLICATIONS

"Impact of Residual Dispersion on SPM–Related Power Margins in 10 Gbit/s–based Systems Using Standard SMF" by G. Bellotti et al., ECOC '98; Sep. 10–24, 1998, Madrid Spain; pp. 681–682.

Fiber Optic Communication Systems, 2nd Ed. by Govind P. Agrawal; John Wiley & Sons, Inc., 1997, pp. 44–45.

* cited by examiner

*Primary Examiner*—Brent A. Swarthout

(57) ABSTRACT

An improved single-channel (SC) or Wavelength-Division Multiplexed (WDM) fiber optic system has post-transmission dispersion compensation using positive and negative compensation selected according to the residual dispersion slope of the fiber link on a per channel basis. A transmitter (TX) is coupled to a receiver (RX) through transmission fibers including standard unshifted fibers (STD) or any other transmission fiber types, compensated by a dispersion-compensating fibers (DCFs). Amplifier units are installed at defined intervals referred to as amplifier spacing. Dispersion-compensating fibers (DCFs) are typically installed between the first and second stage amplifiers. By using dispersion compensation at the end of the line, system performance improves significantly without changing the length of DCF in all amplifiers. Adjusting the dispersion at the end of the line is achieved by increasing or reducing the length of DCF in the last amplifier or by using any other dispersion compensating devices such as fiber Bragg gratings, etc.

17 Claims, 8 Drawing Sheets

FIG. 3
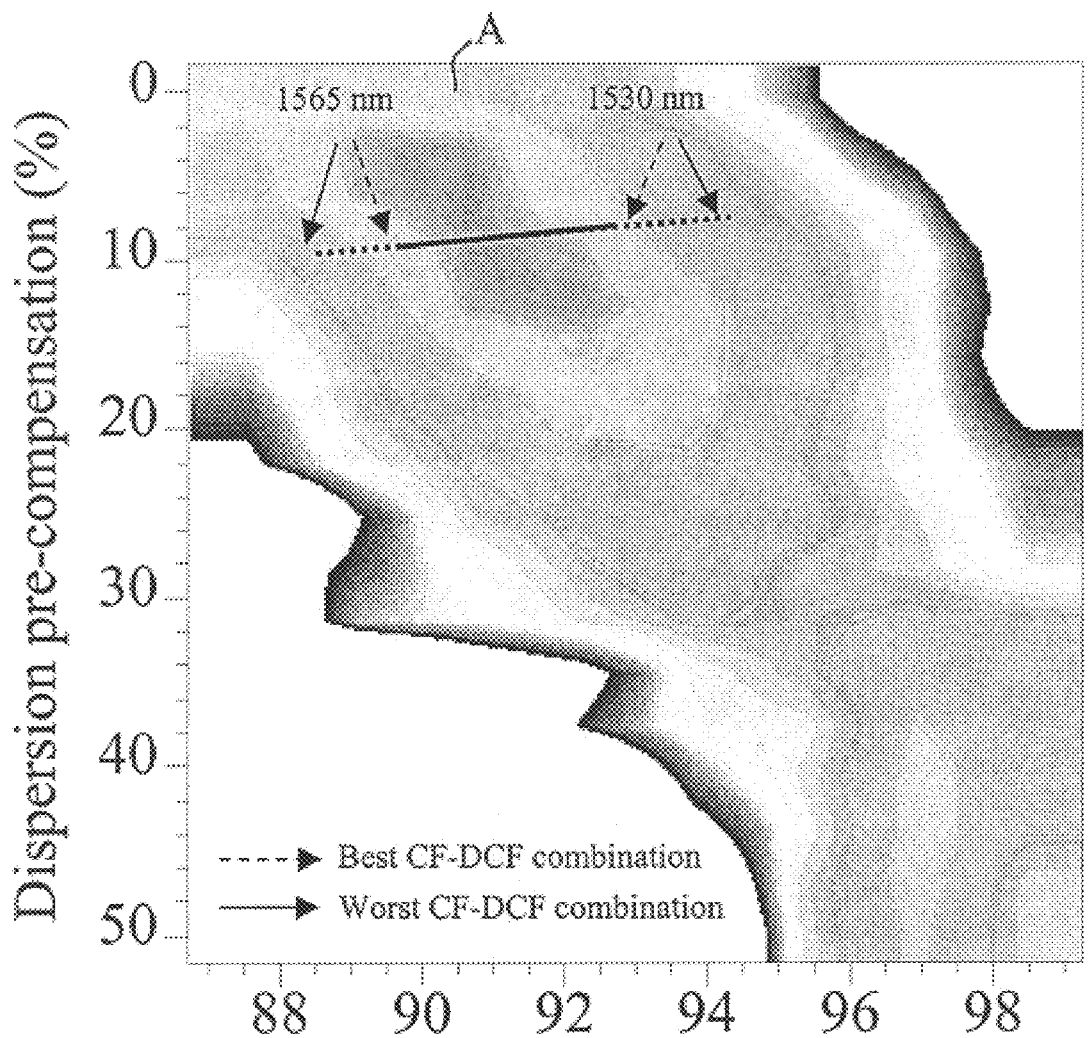
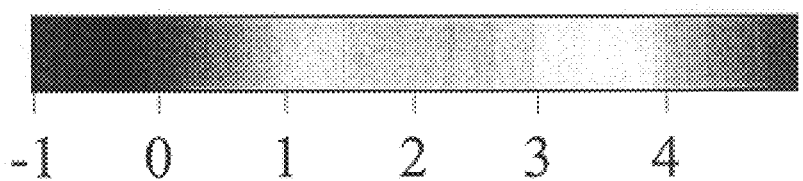

OPTICAL COMMUNICATIONS SYSTEM AND METHOD OF OPERATION FOR PERFORMANCE RECOVERY BY POST-TRANSMISSION DISPERSION COMPENSATION

BACKGROUND OF THE INVENTION

1. Field of the Invention

This invention relates to optical communication systems and methods of operation for performance recovery by post-transmission dispersion compensation.

2. Background Discussion

One method available to increase the capacity of an optical communication system is Wavelength-Division Multiplexing (WDM). WDM makes use of the wideband property of an optical fiber and can increase the capacity of optical communication systems to several tens to several hundred of Gbit/s. In a WDM system each channel suffers chromatic dispersion from the transmission fiber. Chromatic dispersion results from the frequency dependence of the refractive index of silica as well as the waveguide contribution to the effective refractive index. Generally, chromatic dispersion tends to widen the pulses of the digital trains and, hence, creating intersymbol interferences.

Dispersion compensating fibers (DCF) have an opposite dispersion characteristic to the dispersion characteristic of most transmission optical fibers. In the prior art, dispersion-compensating optical fibers have been inserted into the optical transmission to prevent the increase in the quantity of chromatic dispersion for a specific wavelength. This type of dispersion compensating optical fiber has negative dispersion and the increase in the quantity of positive dispersion at a specific wavelength in an optical transmission fiber is reduced by using dispersion-compensating fibers. However, different channel can experience different levels of dispersion before and/or after dispersion compensation. The optimum adjustment of the dispersion levels to get the optimum performance is the main object of this new invention.

DCF can also enhance transmission performance by pre- or post-transmission compensation. Pre-compensation is positioning the DCF before the first transmission fiber of a transmission line. Post-compensation is positioning the DCF after the last transmission fiber of a transmission line.

Besides chromatic dispersion, another factor limiting transmission relates to nonlinear effects. Nonlinear effects induce Self-Phase Modulation (SPM) of the optical pulse. The instantaneous frequency diminishes at the start of the pulse and then increases at its end, proportionally to the derivative of the optical power. The nonlinear effects induce a widening of the spectrum in a spectral composition that fosters a substantial widening for negative chromatic dispersions.

What is needed in the art is an improved system and method for introducing dispersion compensating fibers into a WDM optical transmission system operating at high bit rates, e.g. 10 Gb/s to minimize nonlinear effects and chromatic dispersion.

Prior art related to adjustment of nonlinear and chromatic dispersion in optical communication systems includes the following:

U.S. Pat. No. 5,721,800 to T. Kato et al., issued Feb. 24, 1998 (Kato) discloses a dispersion shifted fiber having a structure for effectively lowering polarization mode dispersion. The dispersion shifted fiber is a single mode, optical fiber mainly composed of silica glass and has a "zero" dispersion wavelength set within the range of at least 1.4 $\mu$m but no longer than 1.7 $\mu$m.

U.S. Pat. No. 5,430,822 to M. Shigematsu et al., issued Jul. 4, 1995 (Shigematsu) discloses an optical communication system that compensates for the dispersion of an optical fiber serving as a transmission path. A dispersion compensation fiber having a sufficient length to compensate for chromatic dispersion of the optical fiber is divided into portions, each portion has a length selected so as to maintain the linear characteristics of a relative intensity noise of the dispersion compensating fiber. The divided portions of the dispersion compensating fiber are inserted in the path of the optical fiber while they are optically separated.

An article entitled "Impact of Residual Dispersion on Self-Phased Modulation (SPM)Related Power Margins in 10 Gbit/s-based Systems Using Standard Single Mode Fibers (SMF)" by G. Bellotti et al., published ECOC '98, Sep. 20–24, 1998, Madrid, Spain, at pages 681–682 (Bellotti) discloses the most performing dispersion compensating technique for single mode fiber transmissions at 10 Gbit/s per second is post compensation. The publication provides a design rule for wave-division multiplexed self-phased modulation-limited transmissions.

U.S. Pat. No. 5,343,322 to F. Pirio et al., issued Aug. 30, 1994 (Pirio) discloses a transmitter and receiver stations connected by a monomode optical fiber with negative chromatic dispersion at the operating wavelength. The receiver station comprises devices to compensate for the distortion due to the nonlinear and chromatic dispersions. The compensation device carries out a positive chromatic dispersion of the received signal. The amplitude of the positive chromatic dispersion is a function of the amplitude of the negative chromatic dispersion induced by the optical fiber as well as of the mean on-line optical power of the signal transmitted on the optical fiber.

U.S. Pat. No. 5,854,871 to Y. Akasaka, issued Dec. 29, 1998 (Akasaka) discloses a wavelength division-multiplex transmission system constructed by connecting a dispersion-shifted optical fiber capable of zero dispersion wavelength to a positive dispersion sloped optical fiber. The fiber has a positive dispersion slope in the range from 1530 nanometers (nm) to 1560 nm and has almost the same dispersion as the same zero dispersion wavelength. The dispersion slope of the positive dispersion slope optical fiber is counterbalanced and compensated. The dispersion around a wavelength from 1530 nm to 1560 nm is made almost zero.

U.S. Pat. No. 5,361,319 to A. J. Antos et al., issued Nov. 1, 1994 (Antos) discloses a family of dispersion compensating optical fibers that are adapted for use with conventional single-mode transmission fibers that are optimized for zero dispersion compensation at a wavelength in the range of 1290 nm to 1330 nm. The compensating fibers are capable of providing dispersion more negative than −20 ps/nm-km and attenuation less than 1 dB/km at wavelengths in the 1520–1565 nm region. Certain other dispersion compensating fibers exhibit dispersion versus wavelength relationship having a negative slope in the 1520–1565 nm region to compensate for the dispersion versus wavelength slope of the transmission fiber. The dispersion compensating fiber can be advantageously combined with a fiber amplifier to form a compensator that is adapted to overcome attenuation introduced to the system by the dispersion compensating fiber.

None of the prior art discloses optimizing fiber optic communication system performance through post-transmission dispersion compensation using positive and negative compensation selected according to the residual dispersion slope of the fiber link on a per channel basis.

SUMMARY OF THE INVENTION

An object of the invention is an optical communication system and method of operation which overcomes dispersion and nonlinearities in wavelength division multiplex (WDM) transmissions.

Another object is an optical communication system and method of operation in WDM transmissions using post-compensation of dispersion to optimize system performance.

Another object is an optical communication system and method of operation using positive and negative dispersion compensation for optimized WDM performance.

Another object is an optical communication system and method of operation using post-dispersion compensation with selected positive and negative compensation.

These and other objects, features and advantages are achieved in an improved single-channel (SC) or Wavelength-Division Multiplexed (WDM) fiber optic system using post-transmission dispersion compensation. A SC/WDM transmitter (TX) is coupled to a SC/WDM receiver (RX) through transmission fibers including standard unshifted fibers (STD) and other transmission fiber types, e.g. dispersion-compensating fibers (DCFs). Amplifier units are installed at defined intervals referred to as amplifier spacing. Each unit includes first, second and third stage amplifiers. Dispersion-compensating fibers (DCFs) are typically installed between the first and second stage amplifiers. Optimum performance of the system (as measured by the minimum eye closure penalty for instance) depends on the length of DCF included in each amplifier. However, by using dispersion compensation at the end of the line, system performance improves significantly without changing the length of DCF in all amplifiers. Adjusting the dispersion at the end of the line is achieved by increasing or reducing the length of DCF in the last amplifier or by using any other dispersion compensating devices such as fiber Bragg gratings, etc. The adjustments of the dispersion compensation using positive and negative compensation at the end of the line can 'cure' systems that would otherwise be considered unusable. The results hold even in presence of high power injected in the DCF. Post-transmission dispersion compensation applies to SC as well as for WDM systems. The method is especially efficient for system at bit rates of 10 Gb/s and above with the Non-Return-to-Zero (NRZ) format but applies to all modulation formats and types of transmission fibers.

DESCRIPTION OF DRAWING

The invention will be further understood from the following detailed description of a preferred embodiment, taken in conjunction with the appended drawing, in which:

FIG. 1A is a table detailing the fiber parameters of each span of the system described in FIG. 1.

FIG. 3 is a representation of typical system performance graph in terms of dispersion pre-compensation and dispersion compensation, shown by eye closure penalty, after transmission over 640 km (8 times 80 km spans) of a signal covering a 35 nm bandwidth.

DESCRIPTION OF PREFERRED EMBODIMENT

Figure 1:
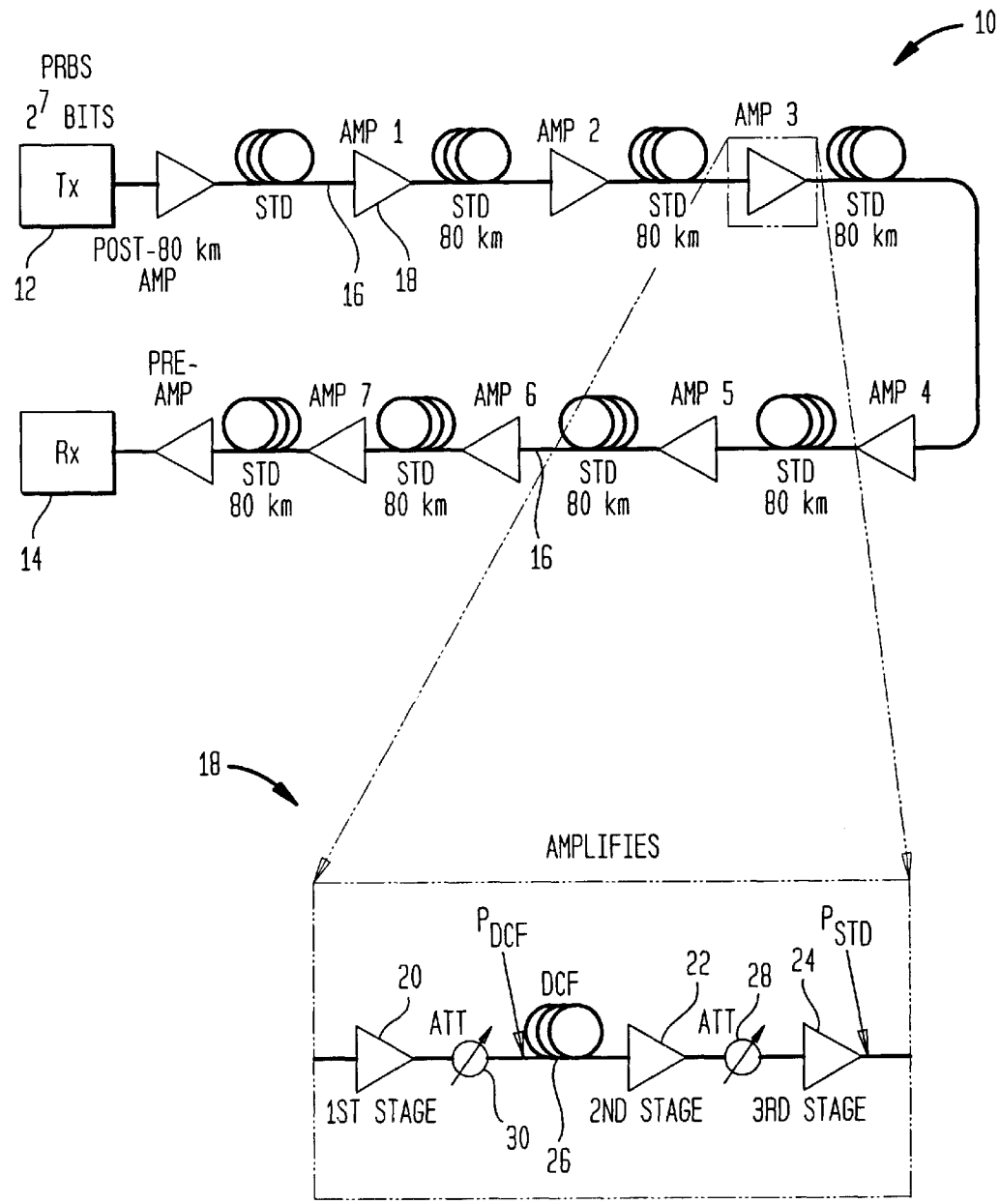
FIG. 1 is a representation of an optical communication system incorporating the principles of the present invention.

In FIG. 1, a Single Channel (SC) or Wavelength Division Multiplex (WDM) optical fiber system 10 includes a transmitter (TX)12 (generating a $2^7$ Pseudo-Random Bit Sequence PRBS in our numerical simulations) is coupled to a receiver (RX)14 through transmission fibers including Standard Unshifted Fibers (STD)16 and other transmission fiber types. Amplifier units 18 are installed at defined intervals, typically 80 km which is referred to as amplifier spacing. Each amplifier 18 includes a first stage 20, a second stage 22, and a third stage 24. Dispersion Compensating Fibers (DCF) 26 are installed between the stages 20 and 22. Gain tilt controls are achieved by a variable attenuator 28 between stages 22 and 24. The attenuator has a range of 20 dB. An attenuator 30 is disposed in front of the DCF 26 and insures that if the length of the DCF is reduced (to increase the under compensation), the total drop of power between the first and second stage remains constant. The attenuator 30 has an attenuation range of 1.5 dB.

Figure 2:
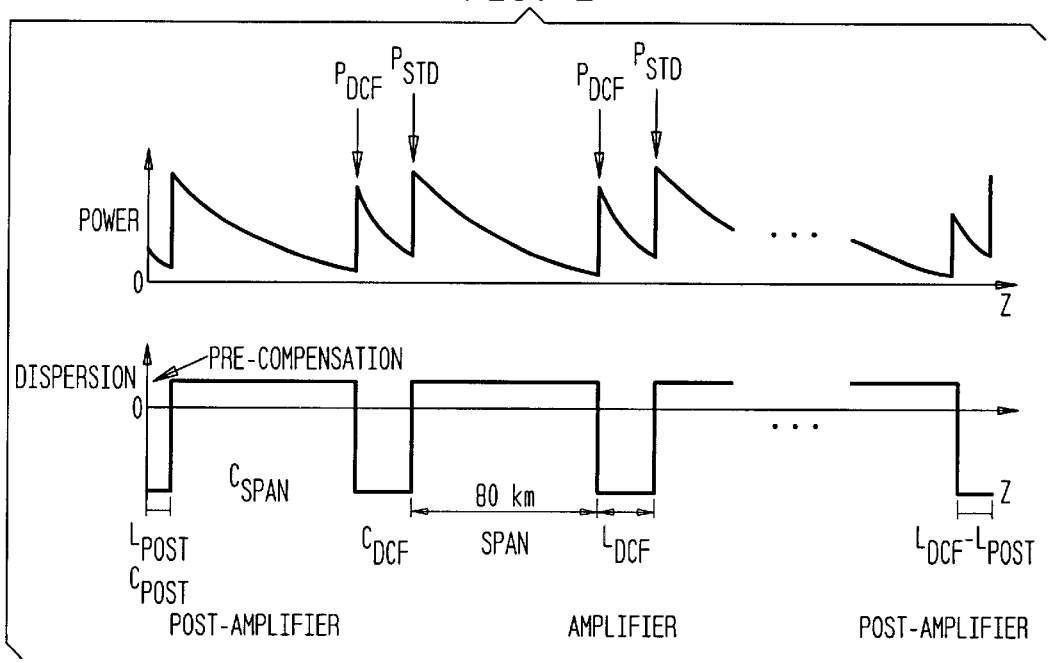
FIG. 2 is a representation of dispersion and power maps in the system of FIG. 1.

FIG. 2 describes the power and dispersion across each span of the system 10. The power entering the standard unshifted fiber is referred to as $P_{std}$ while the power entering the DCF is labeled $P_{DCF}$. The fiber parameters are detailed in Table 1. To vary the power into the DCF, the power exiting the first stage is set in terms of dB to be less than $P_{STD}$. This power is the power that would enter a DCF that would compensate 100% of the dispersion 1 span. As the length of the DCF is reduced to change the ratio of dispersion compensation, the power entering the DCF is reduced by 0.5 dB per km of fiber removed. Thus, if $P_{STD}$=12 dBm and 3 dB drop of power with 87.5% dispersion compensation, then the length of the DCF will be 14 km and $P_{DCF}$ will be 12 dBm–3 dBm–(16–14) km * 0.5 dBm/km=8 dBm.

In FIG. 2, all amplifiers incorporate the same length of DCF, except the first and last amplifiers which share between them the same length of DCF. Managing the dispersion in this manner allows the level of pre-compensation in the first amplifier to be changed without changing the total level of dispersion compensation for the whole system. Any change in system performance by changing the level of pre-compensation can be attributed solely to the nonlinearity in the fibers. The cumulative dispersion is the integrated dispersion (dispersion * distance). $L_{post}$ and $L_{pre}=L_{DCF}-L_{post}$ which are the lengths of the DCF in the first and last amplifiers respectively. Post-transmission dispersion compensation is not shown but consists of adding fiber after the DCF of the last amplifier. The system parameters for pre-compensation and dispersion compensation are given by the following relations:

Pre-compensation(percentage)=100*$C_{POST}/C_{SPAN}$; and

Dispersion Compensation(percentage)=100*$C_{DCF}/C_{SPAN}$ where C=Cumulative Dispersion=Dispersion*Distance.

$C_{post}$=Cumulative Post Dispersion $C_{span}$=Cumulative Span Dispersion $C_{DCF}$=Cumulative Dispersion Compensating Fibers The optimum rule of operation of a system depends on many system parameters. The system operation can be visualized in multi-dimensional graphs shown in FIGS. 3–8. The graphs present system results in an eye closure penalty form described in "Fiber-Optic Communication System" by G. Agrawal, Second Edition, Chapter 4, published by John Wiley, New York, N.Y., (1997) (Agrawal). The eye closure is obtained by first fitting a rectangle (width 20% of the bit period) of maximum height inside an eye diagram shown in Agrawal for the transmitted signal. A filter is used for generating the eye diagram. For purposes of generating the multi-dimensional graphs in FIGS. 3–8, the filter was a Bessel filter of 4th order of bandwidth 70% of the bit rate. The eye closure penalty is obtained by taking the ratio of the rectangle height of the transmitted signal to one of an ideal Non-Return-To-Zero (NRZ) signal (without any transmission). The ratio is generally expressed in dB and shown in a color code representative of different ratios. A bar graph beneath the system operation graph displays the color code for the different ratios.

In FIG. 3, the X axis has a level of in-line dispersion compensation (which is always the same as the total dispersion compensation level the way simulations have been set up) and the Y axis is the level of dispersion pre-compensation. The eye closure penalty for the dispersion compensation is given over the range of −1 to 4 dB Acceptable performance is below 1 or 2 dB of penalty at the beginning of the life of the system. A 40 channel system with channel spacing of 100 Gigahertz (0.8 nm) occupies a little more than 30 nm. Given the dispersion slopes of the fibers involved, the effective in-line dispersion compensation level of a 35 nm system can vary by as much as 4 to 6%. The largest range (worst case) of dispersion compensation is achieved with DCF having a dispersion slope of −0.15 ps/(nm·km) while the lowest range (best case) is achieved with DCF with an increased slope of −0.25 ps/(nm·km) where (ps)=picosecond; (nm)=nanometer, and (km)=kilometers. The slight slope of the line A representing the channel spread in dispersion originates from the dispersion slope of the pre-compensating DCF. The performance of a 10 Gbit/s-based WDM system can be extracted from the graph by first finding the spread in dispersion experienced by the channels and positioning the corresponding spread line to the position of minimal penalty for the worst of the channels considered.

Figure 4:
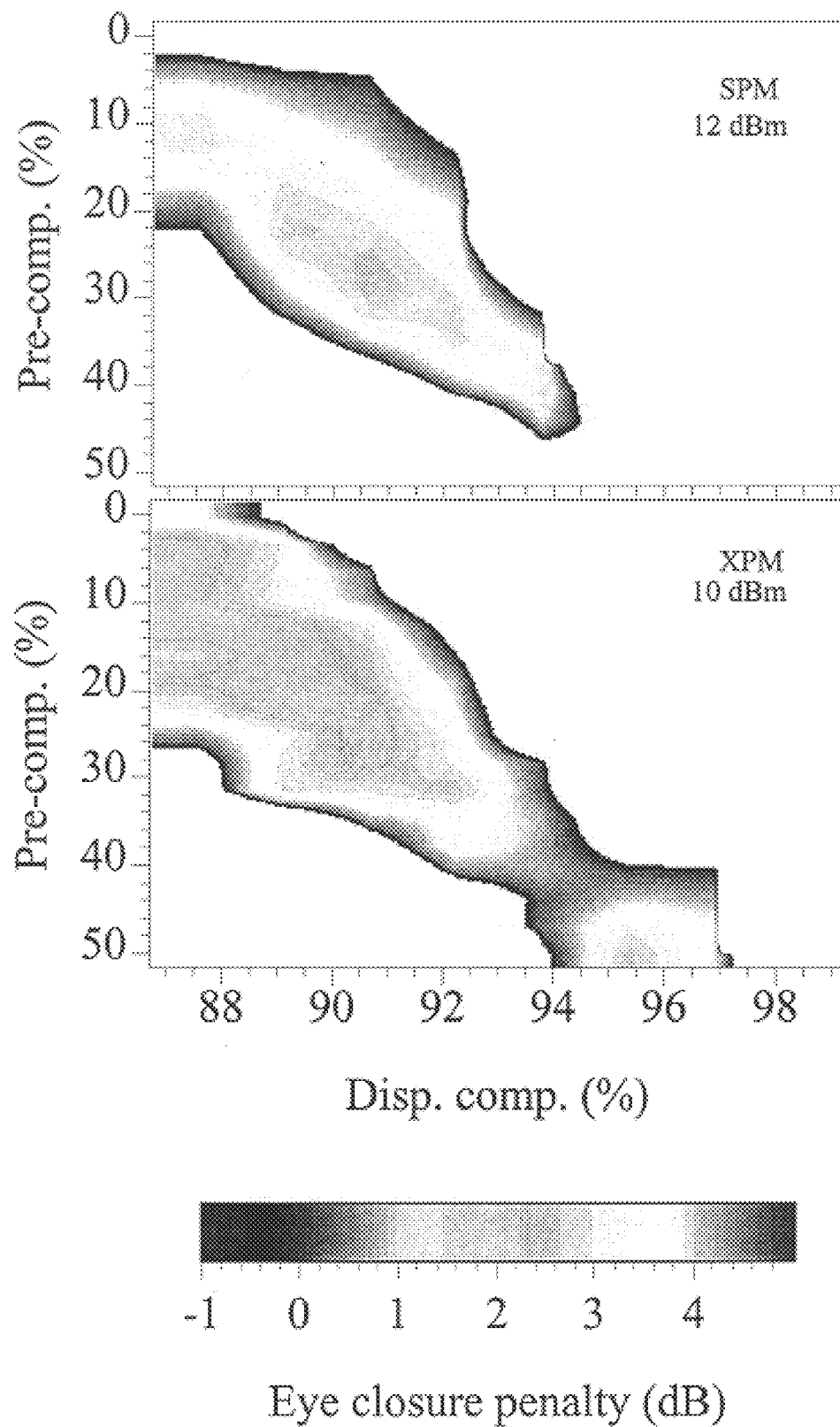
FIG. 4 is a correlation between system performance limited by Self-Phase Modulation (SPM)(single-channel at 12 dBm) and limited by cross-phase modulation (WDM system at 10 dBm).

FIG. 4 represents a side by side comparison of single-channel and multiple-channel systems. The distance of transmission is 640 km and the power in the DCF is 3 dB drop from $P_{STD}$. A power of 12 dBm for single-channel performance and 10 dBm for multiple-channel performances are compared. There is a strong correlation between single-channel and multiple-channel effects when about 2 dB less power is used in multiple-channel systems.

Figure 5:
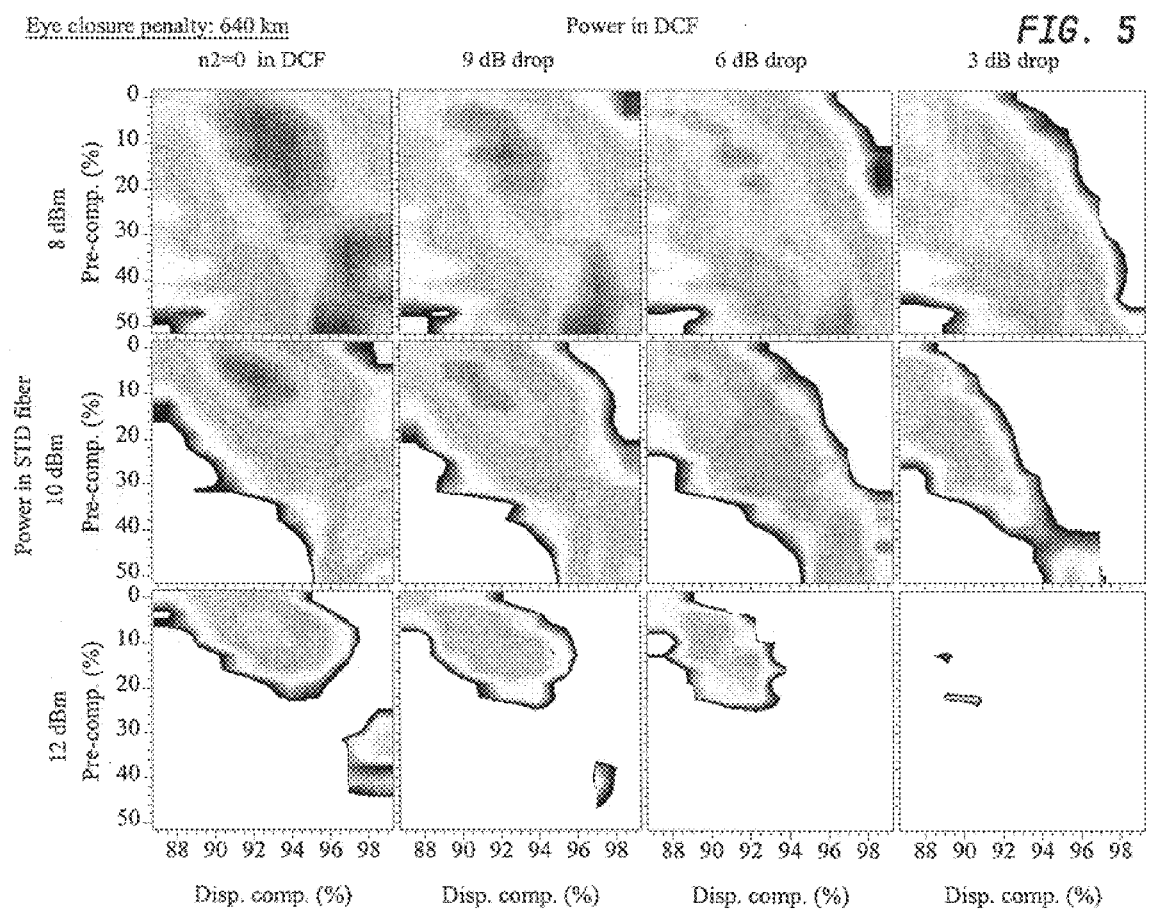
FIG. 5 is a representation of system performance after 640 km of propagation for various power levels entering the standard unshifted fibers and DCF.

FIG. 5 represents the system performance of multi-channel systems after 640 km of propagation for various power levels entering the standard unshifted fiber and DCF. Transmission is terminated using the same level of dispersion compensation as for the last amplifier of FIG. 2 instead of using a full length of DCF used in the in-line amplifiers.

The graph indicates that system performance is negatively affected by an increase of power in the DCF. The deterioration of system performance with an increase of power in DCF increases as the power launched into the standard fibers is increased. FIG. 5 indicates the best system performance is achieved at around 92% of dispersion compensation and a small percentage (5–10%) of pre-compensation.

Figure 6:
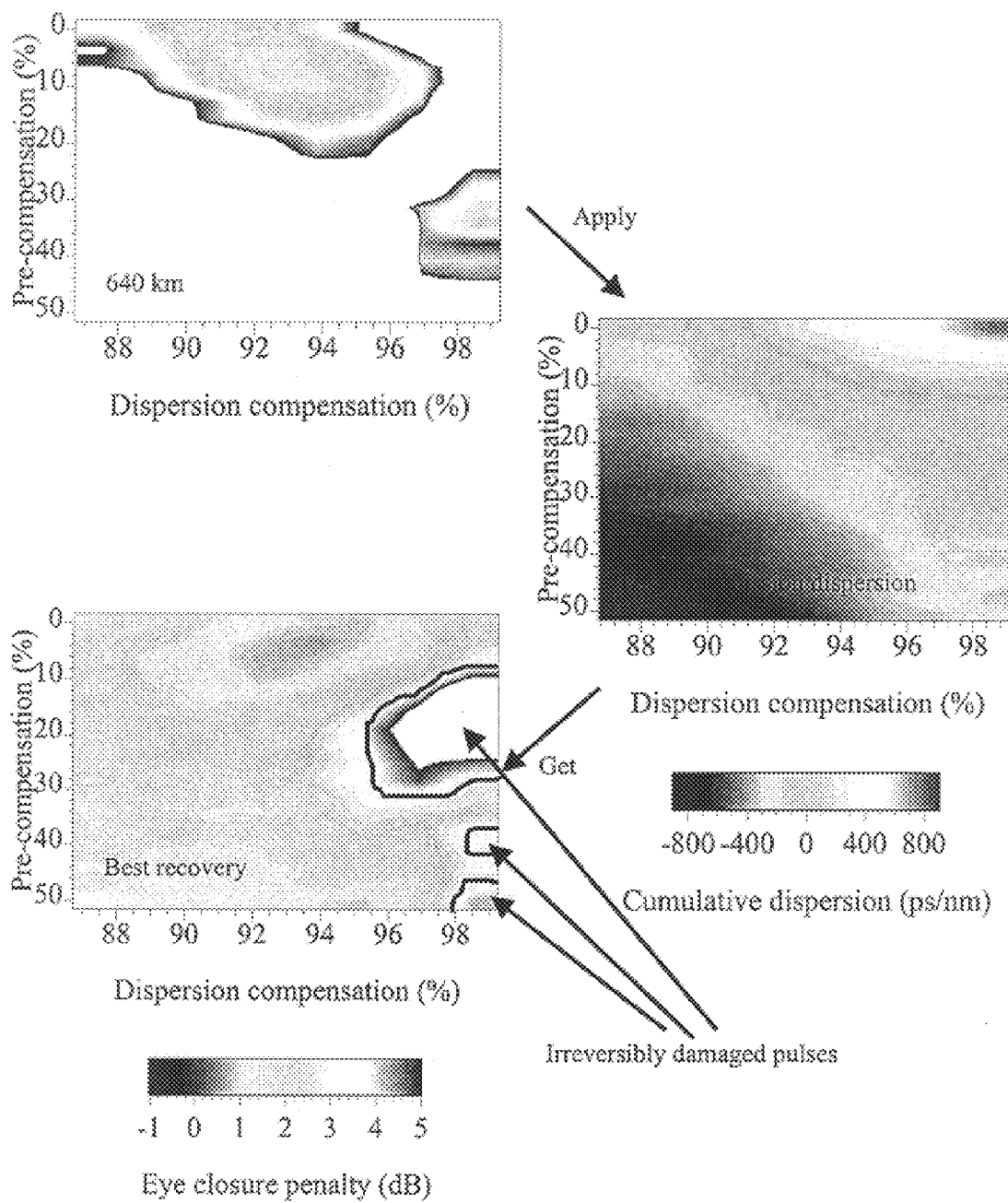
FIG. 6 is a representation of system performance before and after applying post-transmission dispersion compensation.

FIG. 6 shows post-transmission dispersion compensation. Dispersion is applied by small increments after the end of transmission to optimize system performance. The lower figure represents the optimum performance achievable and the rightmost figure is a dispersion which should be applied to reach optimal performance. Power is 12 dBm per channel and non-linearity and DCF is neglected. The upper graph gives the eye-closure penalty after 640 km while the lower graph gives the minimum penalty achievable (best recovery) by post-transmission. The right most graph is the post-transmission dispersion to be applied to reach the best recovery of the system at the end of the transmission The large areas in the parameter space dispersion compensation—precompensation appears as having unacceptable performance after 640 kilometers but can be "recovered" by applying proper post-transmission dispersion compensation. To obtain the best recovery for multi-channel systems, various channels require different levels of dispersion compensation, i.e. dispersion slope compensation. For the typical ratio of post-transmission dispersion slope to dispersion compensation required for best recovery it can be shown that such ratio is beyond the capacity of most if not all manufactured fiber. Fibers generally have a small value of dispersion slope relative to their values of dispersion. However, both dispersion slope and dispersion of fiber gratings can be tailored to a large extent to fit the dispersion profile required to reach optimal system performance. Fiber gratings can have a particularly important application to optimize system performance or even "cure" a system with large uncertainty on the level of in-line dispersion compensation.

Figure 7:
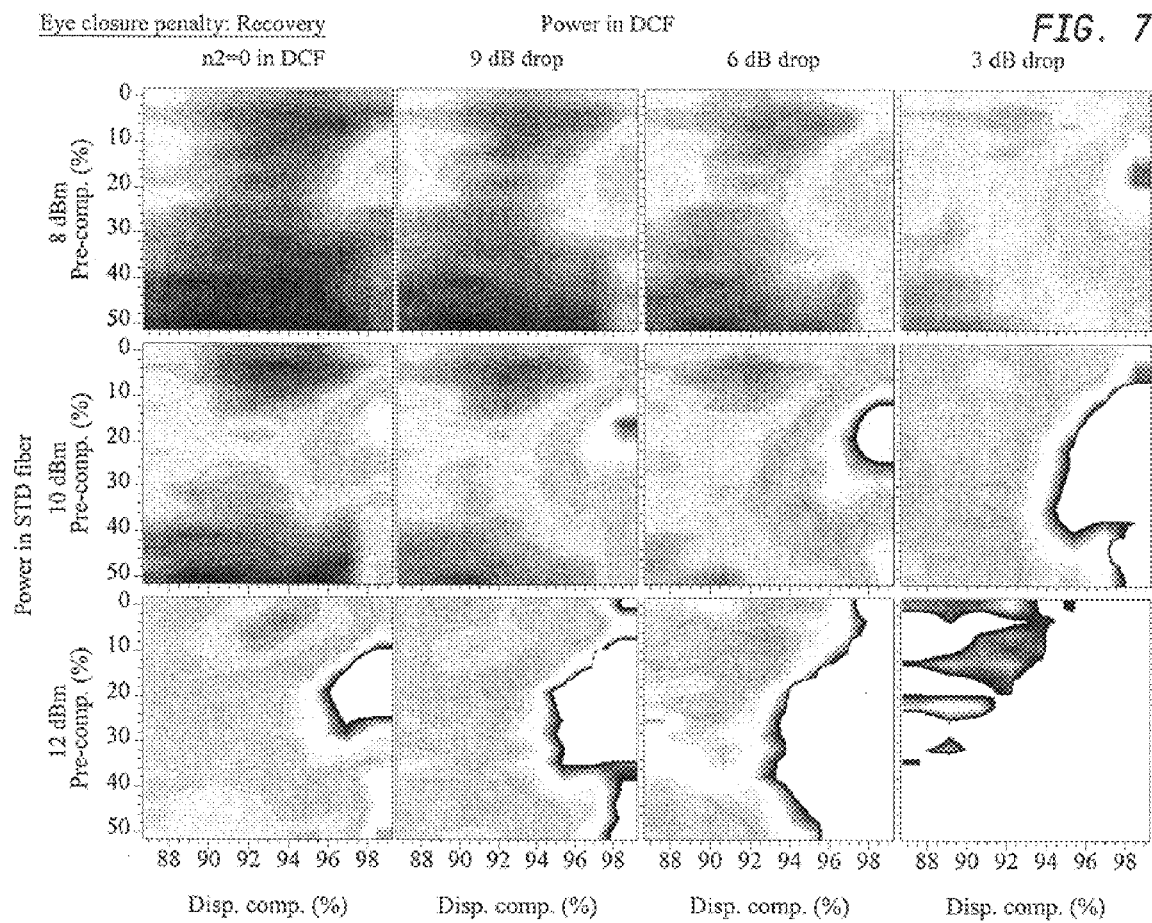
FIG. 7 is a representation of system performance by post-transmission compensation after 640 km propagation for various power levels entering standard, unshifted fibers and dispersion compensated fibers.

FIG. 7 shows the best recovery is done through post-compensation on the results of FIG. 5. As expected, at low power, good system performance exists over wide range of dispersion compensation if recovery is done. However, at high power, acceptable system performance is better achieved if the power in the DCF is kept 9 dB below $P_{STD}$.

Figure 8:
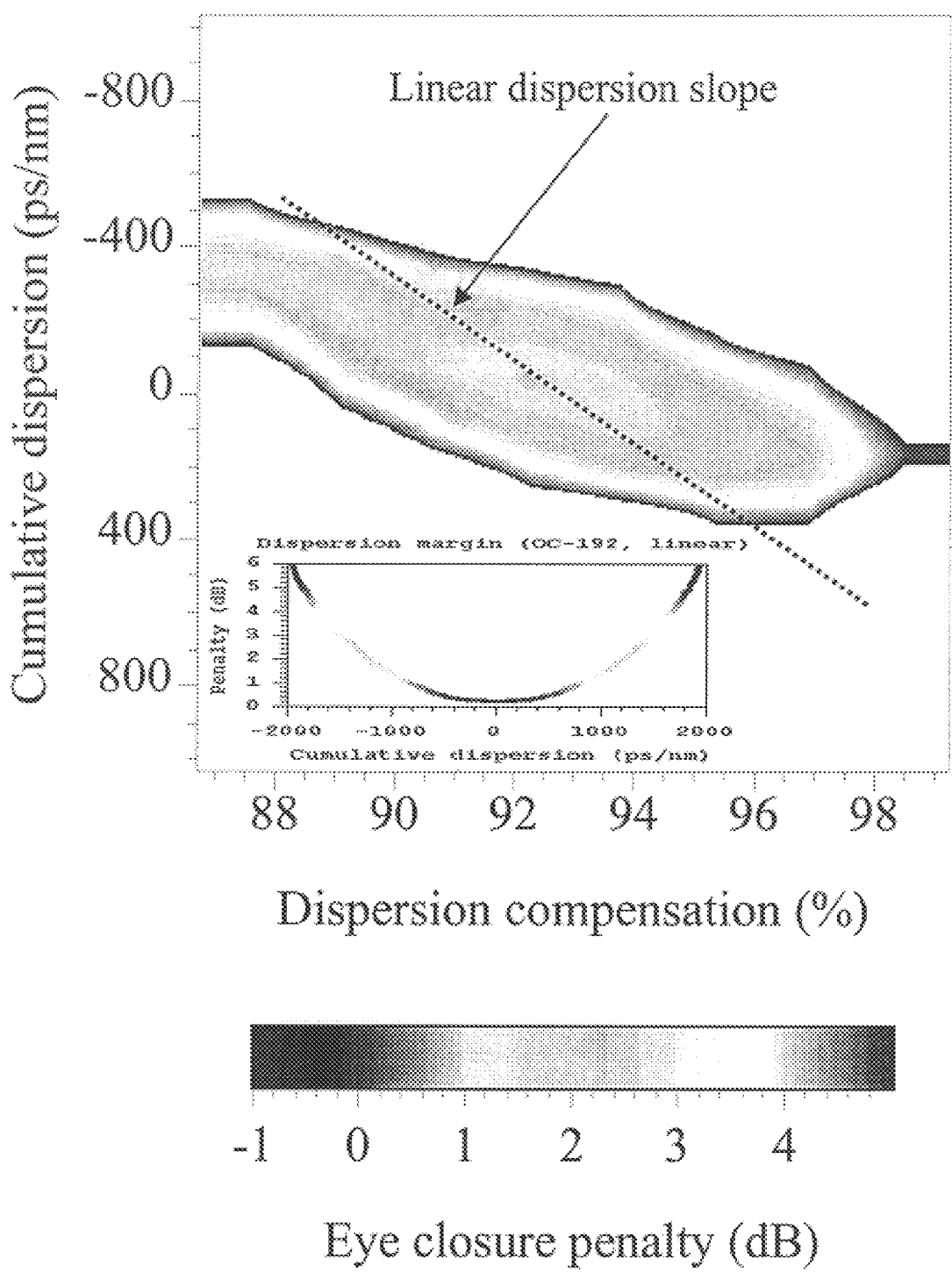
FIG. 8 is a representation of post-transmission compensation for various levels of dispersion compensation.

FIG. 8 shows post-transmission compensation for various levels of dispersion compensation. To recover the best performance from all channels, the dispersion slope which should be applied as post transmission should be less than the slope necessary to equalize the dispersion of all channels. Precompensation is 9.375%, power per channel is 12 dBm and non-linearity in DCF is neglected. The performance of the system has a fixed 10% precompensation and a range of dispersion compensation. The range of dispersion over which acceptable performance exists is only a few hundred ps/nm, much smaller than the 2700 ps/nm range at the system input shown in the inset.

In the inset, the performance of a linear system was plotted for positive and negative dispersion. Positive and negative dispersion was applied to an ideal input 10 Gbs/s NRZ signal. As in preceding graphs, the range of dispersion over which acceptable performance exists is only a few hundred of ps/nm, much smaller than the 2700 ps/nm range at the system input as shown in the inset. To equalize the dispersion of all channels (i.e. compensate the dispersion slope), a cumulative dispersion should be applied according to the linear dispersion slope line shown in FIG. 8. The optimum compensation is also roughly linear but with the slope smaller than the slope expected from full dispersion slope compensation. Areas of good performance are characterized by some form of pulse compression in the first tens of km of each span. A reduction of duty cycle and some form of pre-chirping will further improve system performance. FIG. 8 further suggests that optimum performance in non-linear systems does not necessarily occur with all channels ending up with the same cumulative dispersion.

The inset further shows that there is a considerable shrinkage of the range of dispersion for acceptable system performance (<2 dB penalty) from about 2700 ps/nm for the original signal to be about 200 ps/nm after 640 kilometers of propagation at 12 dBm per channel. The total dispersion of the system is not affected by changing the level of precompensation since the precompensation is always removed from the DCF of the last amplifier. The fact that the amount of post-transmission dispersion for best recovery increases as pre-compensation increases originates solely from fiber nonlinearity. If fiber non-linearity were not contributing to the optimal performance of the system, the area of the best recovery would correspond to full dispersion slope compensation. However, since the system is highly non-linear, the optimal system performance is reached using different post-transmission compensation for different levels of precompensation. This reflects that precompensation changes the nature of the propagation in the fibers.

Summarizing, post-transmission dispersion compensation using positive and negative dispersion, selected according to the residual dispersion slope of the fiber link on a per channel basis, provides improved system performance of SC and WDM systems operating at high bit rates, e.g. 10 Gb/s and optionally having a reduced duty cycle or incorporating some form of pre-chirping.

I claim:

1. A method for improved performance of a Wavelength-Division-Multiplexed (WDM) fiber optic system including standard unshifted fibers and dispersion compensating fibers with or without a dispersion slope in each fiber, comprising the steps of:

(a) changing the level of dispersion compensation in a first amplifier unit of the system;

(b) changing the level of dispersion compensation in in-line amplifiers units of the system, where dispersion compensation in the in-line amplifiers is the same; and (c) providing post-transmission dispersion compensation in a last amplifier before detection where the post compensation is different in terms of fiber length from dispersion of the in-line amplifiers unit, in order to (a) compensate for distortion from non-linear effects and (b) permit maximum signal power transmission in the system, in the range of 6 dBm to 12 dBm.

2. The method of claim 1 further comprising the step of:

(d) adjusting the post-transmission dispersion compensation by varying the length of the dispersion compensated fibers in the last amplifier unit of the system to be independent of the fiber length in the in-line amplifier units.

3. The method of claim 1, further comprising the step of:

(e) using fiber Bragg gratings for post-transmission dispersion compensation.

4. The method of claim 1 wherein a transmission line includes a plurality of spans and further comprising the step of:

(d) using pulse compression at the beginning of a span for reduction of duty cycle.

5. The method of claim 1 further comprising the step of:

(e) using selected positive and negative post-transmission dispersion compensation in the last amplifier unit of the system.

6. The method of claim 1 further comprising:

(f) reducing the duty cycle of modulation format using in the system.

7. The method of claim 1 further comprising the step of:

(g) using dispersion compensated fibers having a slope in the range of −0.25 ps/(nm$^2$·km) where (ps)= picosecond; (nm)=nanometer, and (km)=kilometers.

8. An improved fiber-optic Wavelength-Division Multiplexed system (WDM) including but not limited to standard unshifted fibers, comprising:

(a) a WDM receiver coupled to the system for receiving an input signal with reduced transmission penalties;

(b) means for changing the level of dispersion compensation in a first amplifier unit of the system;

(c) means for changing the level of dispersion compensation in in-line amplifiers units of the system, where dispersion compensation in the in-line amplifiers is the same; and (d) means for providing post-transmission dispersion to the receiver input signal in a last amplifier unit before detection where the post compensation fiber length is different from fiber length of the dispersion compensation of the in-line amplifiers to compensate for distortion from non-linear effects and permit maximum signal power transmission in the range of 6dBm to 12 dBm for optimum signal transmission.

9. The system of claim 8 further comprising:

(c) means for changing the level of dispersion compensation in the in-line amplifiers units of the system.

10. The system of claim 8 further comprising:

(d) means for providing positive and negative dispersion in the last amplifier unit prior to a detector for compensation of non-linearity effects and permitting maximum power transmission on the system.

11. The system of claim 8 further comprising:

(e) fiber Bragg gratings providing post dispersion compensation to the receiver input signal.

12. The system of claim 8 further comprising:

(f) a fiber transmission line coupling the receiver to a transmitter in a series of spans, each span including an amplifier unit, the units beginning at the transmitter and ending at the receiver:

(g) all amplifiers incorporating dispersion compensated fibers of the same length, except the first and last amplifier.

13. The system of claim 12 further comprising:

(h) means for adjusting the post-transmission dispersion compensation by increasing or decreasing the length of the dispersion compensated fibers in the last amplifier unit before the receiver to be independent from the inline amplifier units.

14. The system of claim 8 further comprising:

means for reducing the duty cycle of the system.

15. An improved fiber optic Wavelength-Division-Multiplexed (WDM) system including a fiber transmission line having standard unshifted fibers and dispersion compensated fibers, comprising:

(a) a transmitter coupled to one end of the fiber transmission line for transmitting in any modulating format;

(b) a receiver coupled to the other end of the fiber transmission line for receiving the modulated signal with reduced transmission penalty;

(c) in-line amplifier units installed in discrete intervals of the fiber transmission, each amplifier unit including dispersion compensated fibers, where dispersion compensation in the in-line amplifiers is the same; and (d) means for providing post-transmission dispersion to the modulated input signal in a last amplifier unit before detection where the post compensation is different in fiber length from dispersion compensation of the in-line amplifiers units to (a) compensate for distortion from non-linear effects and (b) permit maximum signal power transmission in the system, in the range of 6 dBm to 12 dBm.

16. The system of claim 15 further comprising:

(f) means for adjusting the post-transmission dispersion compensation by increasing or decreasing the length of the dispersion compensated fibers in the last amplifier unit coupled to the receiver to be independent from the in-line amplifier units.

17. Improved fiber-optic Wavelength-Division Multiplexed system (WDM) including but not limited to standard unshifted fibers, comprising:

(a) in-line amplifier units installed in discrete intervals of the system, each amplifier unit including dispersion compensated fibers of the same length; where dispersion compensation in the in-line amplifiers is the same; and (b) means providing post-transmission dispersion compensation in a last amplifier unit before detection where the post compensation is different in terms of fiber length from the dispersion compensation of the in-line amplifier units to compensate for distortion from non-linear effects and permitting maximum signal power transmission in the system, in the range of 6 dBm to 12 dBm.

* * * * *